July 29, 1952     W. R. ALEXANDER     2,605,116
NESTING BASKET CART

Filed Nov. 6, 1950     3 Sheets-Sheet 1

INVENTOR.
Walker R. Alexander
BY
Otto A. Earl
Attorney

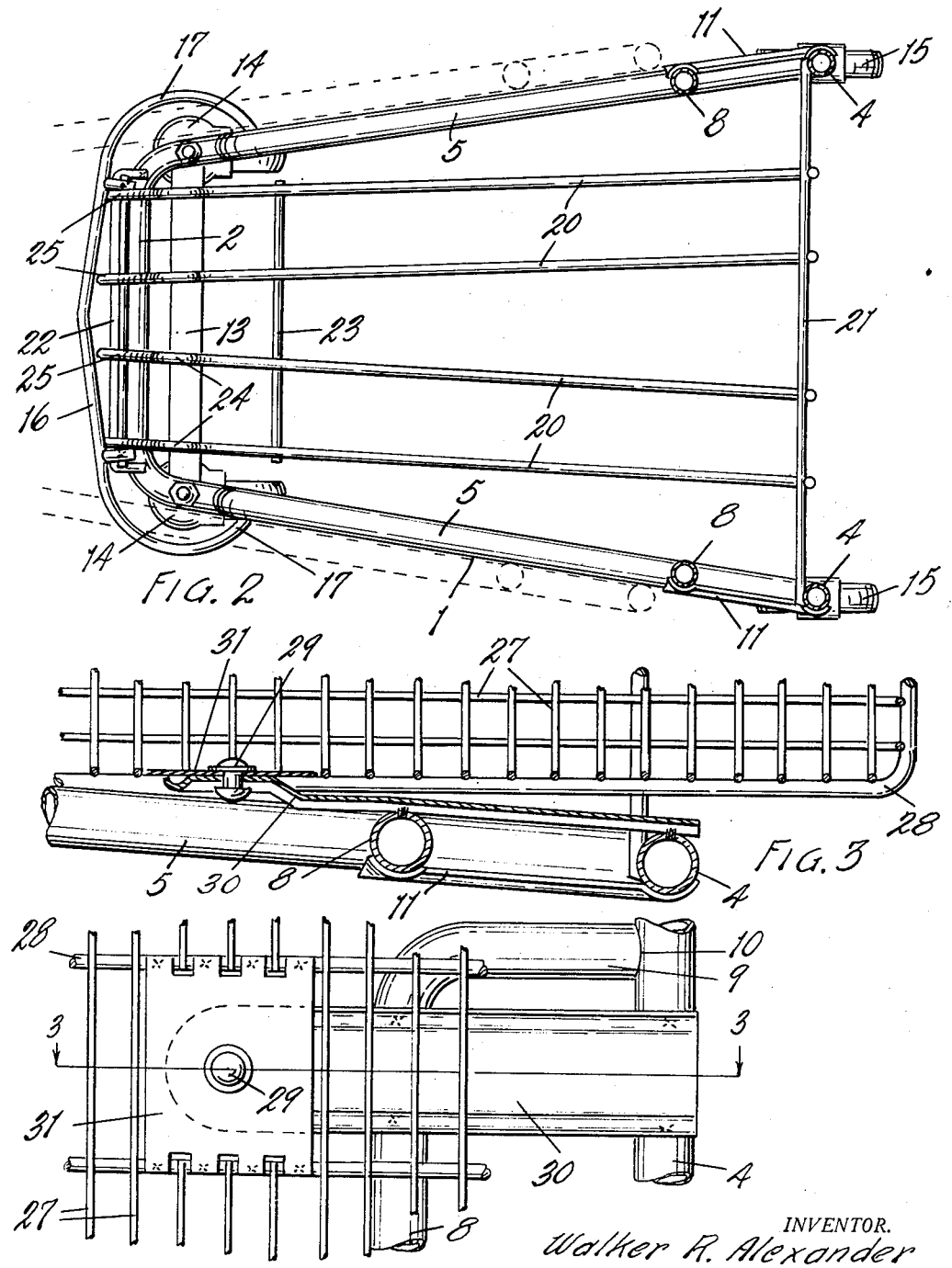

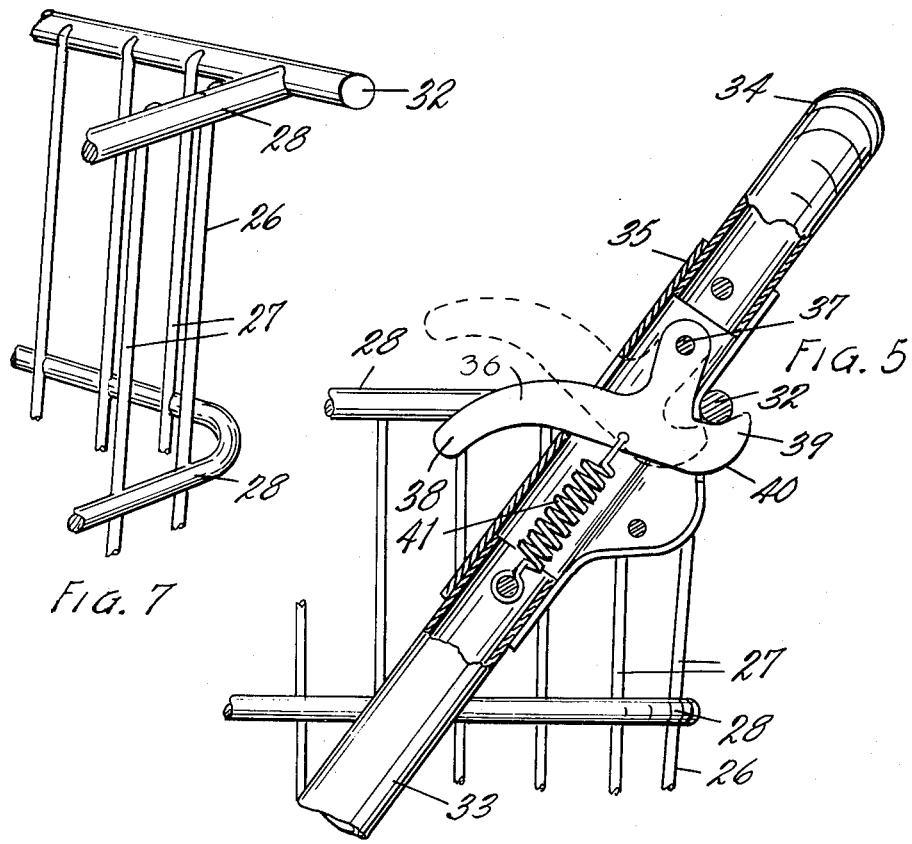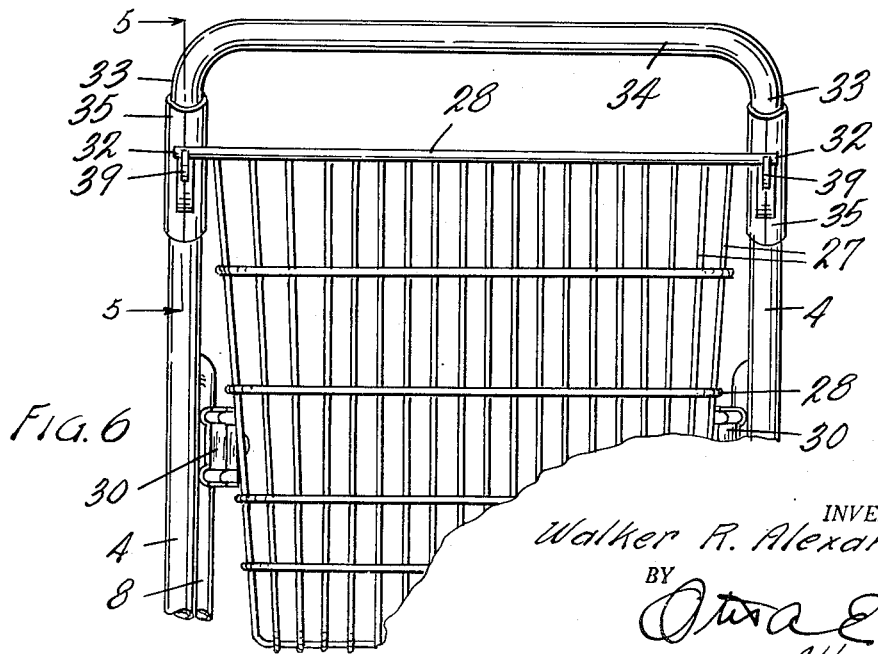

Patented July 29, 1952

2,605,116

UNITED STATES PATENT OFFICE 2,605,116

NESTING BASKET CART

Walker R. Alexander, Battle Creek, Mich., assignor to United Steel & Wire Company, Battle Creek, Mich.

Application November 6, 1950, Serial No. 194,334

12 Claims. (Cl. 280—50)

This invention relates to improvements in basket carts.

The principal objects of this invention are:

First, to provide a basket cart which is well adapted for use in self-serve stores and markets and which, when not in use, may be quite compactly nested with similar carts.

Second, to provide a basket cart which may be formed of relatively light stock and at the same time is strong and rigid and capable of carrying heavy loads and withstanding shocks.

Third, to provide a basket cart with a platform on which baskets or bags of heavy objects may be conveniently placed and are readily accessible for removal.

Fourth, to provide a structure of the class described which is quite economical to produce and at the same time is attractive in appearance.

Objects relating to details and economies of the invention will appear from the description to follow. The invention is defined and pointed out in the claims.

A preferred embodiment of the invention is illustrated in the accompanying drawing, in which:

Fig. 2 is a somewhat enlarged horizontal section on a line corresponding to line 2—2 of Fig. 1, one cart being shown in full lines and fragments of a second cart nested therewith being shown by dotted lines.

Fig. 3 is an enlarged fragmentary view in section on a line corresponding to line 3—3 of Fig. 1.

Fig. 4 is an enlarged fragmentary side elevational view showing details of the mounting of the basket.

Fig. 5 is an enlarged fragmentary view partially in section on a line corresponding to line 5—5 of Fig. 6 showing details of the basket supporting latch, the manipulation of the latch to releasing position being indicated by dotted lines.

Fig. 6 is a fragmentary rear elevational view with the basket in erected position.

Fig. 7 is a fragmentary perspective view of the basket and one of the combined keepers and stops thereof.

Figure 1:
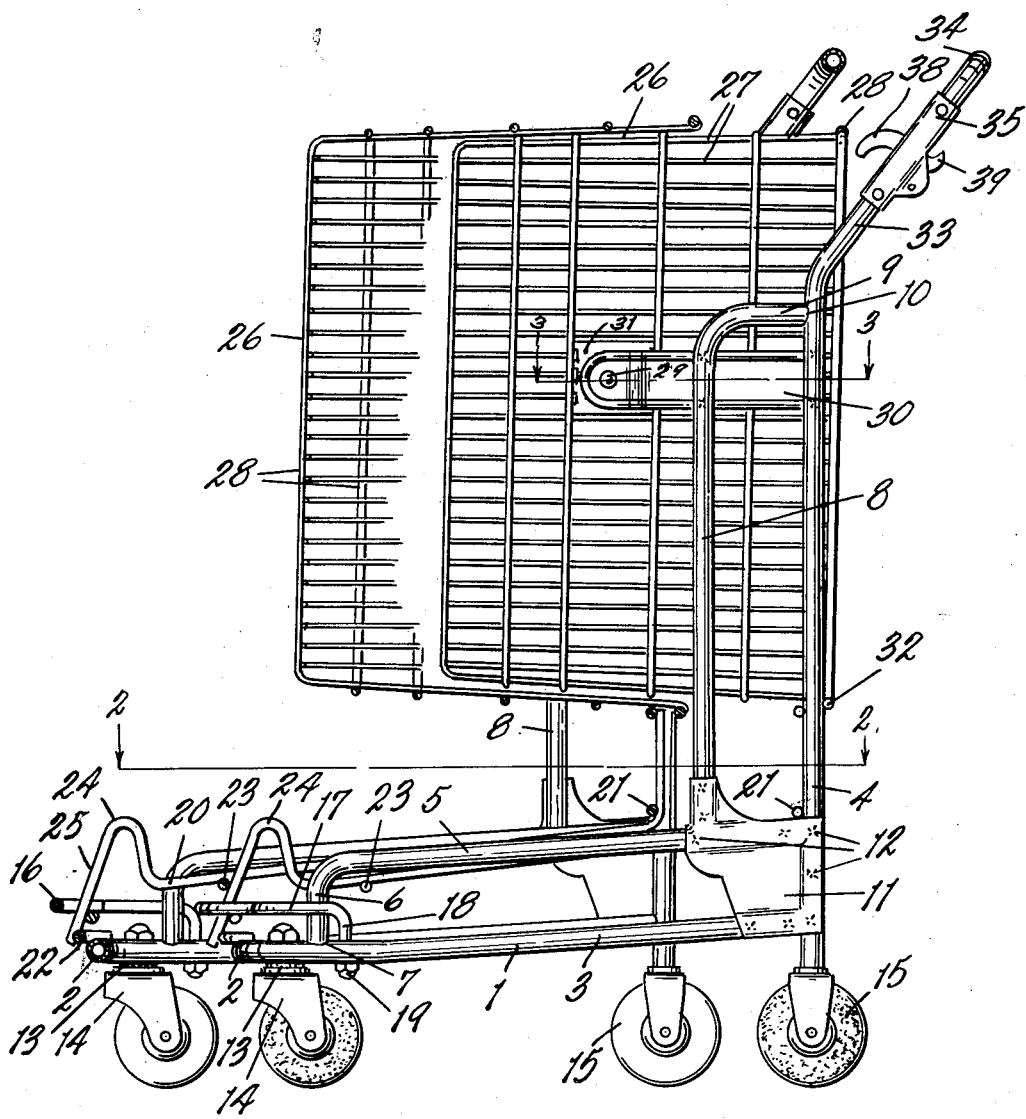
Fig. 1 is a fragmentary side elevational view of a pair of the carts of my invention in nested relation, one of the carts being shown in full lines and the other in vertical section.

The embodiment of my invention illustrated comprises a forwardly tapered U-shaped base frame designated generally by the numeral 1 disposed with its bight end 2 forwardly. The rear ends of the side members 3 of the base frame are fixedly secured to the rear or main uprights 4 preferably by welding. Base side members 5 are provided, these having downturned front ends 6 secured to the upper sides of the side members 3 of the base frame 1 at 7 preferably by welding. The rear ends of these side bars 5 are fixedly secured to the front sides of the uprights 4. Auxiliary uprights 8 are disposed in parallel relation to the main uprights 4 and have rearwardly turned upper ends 9 fixedly secured at 10 to the main uprights. The lower ends of these uprights 8 are fixedly secured to the upper sides of the base side members 5.

Bracing or stay plates 11 are provided, these being formed of sheet metal and conformed to embrace portions of the base side members 3, the side bars 5 and the main and auxiliary uprights 4 and 6 being fixedly secured to these parts by welds indicated at 12. This provides a very rigid frame structure even when formed of relatively light stock. I have not in general indicated the welded joints between these frame parts other than the indication at 12, as welds of this type are well understood in the art.

The base frame is provided with a cross bar 13 adjacent its front end which facilitates the attaching of the caster wheel forks 14 to the base frame. Supporting forks for the rear carrying wheels 15 are secured to the lower ends of the main uprights 4. It will be noted that the base is forwardly tapered as well as forwardly inclined. The purpose of this is to permit the telescoping of one base within another, as is indicated in Figs. 1 and 2. The base is provided with a fender 16 at its front end having rearwardly curved arms 17 terminating in downturned ends 18 disposed through the side member 3 of the base frame and secured as by means of the nuts 19.

I provide a platform which comprises spaced longitudinal bars 20 secured at their rear ends to a cross bar 21 and at their front ends to a cross bar 22 mounted on the front end of the base frame. The longitudinal platform bars are provided with a connecting cross piece 23. The longitudinal bars have upwardly offset portions 24 which serve as load retaining stops, the front ends of the offset 25 being extended downwardly and secured to the cross piece 22. This platform is adapted to receive a bag or box of produce.

The basket designated generally by the numeral 26 is downwardly tapered and is made up of wire slats 27 and spaced frame members 28. The basket is pivotally mounted at 29 to forwardly projecting arms 30 secured to the uprights 4 and 8, the basket being provided with pivot receiving plates 31 which are positioned so that the basket when free automatically swings to a rearwardly facing horizontal position as shown in the drawing. The basket is provided with laterally projecting keepers 32 which serve as stops coacting with the uprights 4 when the basket is in collapsed position as shown in Fig. 1.

The uprights 4 are provided with rearwardly projecting portions 33, to which the handle bar 34 is secured by means of the tubular coupling members 35. These coupling members are slotted to receive the latches 36 which are pivoted at 37 and provided with hand pieces 38 projecting forwardly and hook-like engaging portions 39 having curved faces 40 to permit automatic engagement of the keepers with the latches when the basket is swung to upright position. The latches are urged to engaging position by means of the springs 41.

When the baskets are in collapsed position as shown in Fig. 1, they are adapted to nest to a substantial extent, as illustrated in Fig. 1. When the carts are not in nested position, the baskets may be easily swung to upright position and are automatically engaged by the latches and retained in erected position. When the latches are released, the baskets automatically swing to their rearwardly facing or nesting position. The baskets illustrated are of generally rectangular section, but they may be round if desired.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

Having thus described my invention, what I claim as new and desire to secure by Letters Patent is:

1. In a basket cart the combination of a forwardly tapered and forwardly inclined U-shaped base frame disposed with its bight end forwardly, main uprights fixedly secured to the rear ends of the side members of said base frame, base side bars having down-turned front ends secured to said base frame adjacent but in rearwardly spaced relation to its front end, the rear ends of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, bracing and connecting corner brackets welded to the rear ends of said base and side bars and to the lower ends of said main and auxiliary uprights, a cross bar secured to the under side of said base frame adjacent its front end, caster wheels connected to said base frame at the ends of said cross bar, rear carrying wheels secured to the lower ends of said main uprights, a platform comprising a rear cross bar mounted on said main uprights and a front cross bar mounted on the forward end of said base frame, and a plurality of laterally spaced forwardly inclined bottom bars secured at their rear ends to said rear cross bar and having upward offsets adjacent their front ends to provide stops, said bottom bars in front of said offsets being downwardly inclined and secured to said front cross bar, a fender disposed in front of the front ends of said platform bottom bars and having rearwardly curved ends constituting guards for said caster wheels and secured to the side members of said base frame, and forwardly projecting basket supporting arms mounted on the inner sides of said main and auxiliary uprights, and a basket tiltably mounted on said arms.

2. In a basket cart the combination of a forwardly tapered and forwardly inclined U-shaped base frame disposed with its bight end forwardly, main uprights fixedly secured to the rear ends of the side members of said base frame, base side bars having down-turned front ends secured to said base frame adjacent but in rearwardly spaced relation to its front ends, the rear ends of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, bracing and connecting corner brackets welded to the rear ends of said base and side bars and to the lower ends of said main and auxiliary uprights, a cross bar secured to the under side of said base frame adjacent its front end, caster wheels connected to said base frame at the ends of said cross bar, rear carrying wheels secured to the lower ends of said main uprights, a platform comprising a rear cross bar mounted on said main uprights and a front cross bar mounted on the forward end of said base frame, and a plurality of laterally spaced forwardly inclined bottom bars secured at their rear ends to said rear cross bar and having upward offsets adjacent their front ends to provide stops, said bottom bars in front of said offsets being downwardly inclined and secured to said front cross bar, a fender disposed in front of the front ends of said platform bottom bars and having rearwardly curved ends constituting guards for said caster wheels and secured to the side members of said base frame.

3. In a basket cart the combination of a forwardly tapered and forwardly inclined U-shaped base frame disposed with its bight end forwardly, main uprights fixedly secured to the rear ends of the side members of said base frame, base side bars having downturned front ends secured to said base frame adjacent but in rearwardly spaced relation to its front end, the rear ends of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, bracing and connecting corner brackets welded to the rear ends of said base and side bars and to the lower ends of said main and auxiliary uprights, a cross bar secured to the under side of said base frame adjacent its front end, caster wheels connected to said base frame at the ends of said cross bar, rear carrying wheels secured to the lower ends of said main uprights, a platform comprising a rear cross bar mounted on said main uprights and a front cross bar mounted on the forward end of said base frame, and a plurality of laterally spaced forwardly inclined bottom bars secured at their rear ends to said rear cross bar and having upward offsets adjacent their front ends to provide stops, said bottom bars in front of said offsets being downwardly inclined and secured to said front cross bar.

4. In a basket cart the combination of a forwardly tapered and forwardly inclined U-shaped base frame disposed with its bight end forwardly, main uprights fixedly secured to the rear ends of the side members of said base frame, base side bars having downturned front ends secured to said base frame adjacent but in rearwardly spaced relation to its front end, the rear ends of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, bracing and connecting corner brackets welded to the rear ends of said base and side bars and to the lower ends of said main and auxiliary uprights, a cross bar secured to the under side of said base frame adjacent its front end, caster wheels connected to said base frame at the ends of said cross bar, and rear carrying wheels secured to the lower ends of said main uprights.

5. In a basket cart the combination of a forwardly tapered and forwardly inclined U-shaped base frame disposed with its bight end forwardly, main uprights fixedly secured to the rear ends of the side members of said base frame, base side bars having downturned front ends secured to said base frame adjacent but in rearwardly spaced relation to its front end, the rear ends of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, carrying wheels, a platform comprising a rear cross bar mounted on said main uprights and a front cross bar mounted on the forward end of said base frame, and a plurality of laterally spaced forwardly inclined bottom bars secured at their rear ends to said rear cross bar and having upward offsets adjacent their front ends to provide stops, said bottom bars in front of said offsets being downwardly inclined and secured to said front cross bar, a fender disposed in front of the front ends of said platform bottom bars and having rearwardly curved ends constituting guards for said caster wheels and secured to the side members of said base frame.

6. In a basket cart the combination of a forwardly tapered and forwardly inclined U-shaped base frame disposed with its bight end forwardly, main uprights fixedly secured to the rear ends of the side members of said base frame, base side bars having downturned front ends secured to said base frame adjacent but in rearwardly spaced relation to its front end, the rear end of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, bracing and connecting corner brackets welded to the rear ends of said base bars and side bars and to the lower ends of said main and auxiliary uprights, caster wheels connected to said base frame at the front ends thereof, rear carrying wheels secured to the lower ends of said main uprights, a platform comprising a rear cross bar mounted on said main uprights and a front cross bar mounted on the forward end of said base frame, and a plurality of laterally spaced bottom bars secured at their rear ends to said rear cross bar and having upward offsets adjacent their front ends to provide stops, said bottom bars in front of said offsets being downwardly inclined and secured to said front cross bar.

7. In a basket cart the combination of a forwardly tapered and forwardly inclined U-shaped base frame disposed with its bight end forwardly, main uprights fixedly secured to the rear ends of the side members of said base frame, base side bars disposed in vertically spaced relation above the side member of said frame and having downturned front ends disposed upon and secured to the upper side of said base frame adjacent but in rearwardly spaced relation to its front end, the rear ends of said side bars abutting and fixedly secured to said main uprights, said uprights having rearwardly inclined handle portions connected by a handle bar which constitutes a cross member therefor, auxiliary uprights disposed in forwardly spaced relation relative to said main uprights and having their lower ends abutting and secured to the upper sides of said side bars and having rearwardly turned upper ends abutting and secured to the front sides of said main uprights, bracing and connecting corner brackets disposed on the outer sides of and welded to the rear ends of said base bars and side bars and to the lower ends of said main and auxiliary uprights, caster wheels connected to said base frame at the front ends thereof, rear carrying wheels secured to the lower ends of said main uprights.

8. In a basket cart the combination of a forwardly tapered and forwardly inclined U-shaped base frame disposed with its bight end forwardly, main upright fixedly secured to the rear ends of the side members of said base frame, base side bars having downturned front ends secured to said base frame adjacent but in rearwardly spaced relation to its front end, the rear end of said side bars being fixedly secured to said main uprights, said uprights having rearwardly inclined handle portions connected by a handle bar which constitutes a cross member therefor, auxiliary uprights disposed in forwardly spaced relation relative to said main uprights and having their lower ends secured to said side bars and having rearwardly turned upper ends secured to said main uprights, bracing and connecting corner brackets welded to the rear ends of said base bars and side bars and to the lower ends of said main and auxiliary uprights, caster wheels connected to said base frame at the front ends thereof, rear carrying wheels secured to the lower ends of said main uprights, forwardly projecting basket supporting arms mounted on the inner sides of said main and auxiliary uprights, a basket tapered towards its bottom pivotally mounted between said arms and balanced on its pivots to normally swing to a rearwardly facing position, said basket being provided with laterally projecting keepers constituting stops engageable with said main uprights when the basket is in horizontal position, and spring biased latches mounted on the rearwardly inclined handle portions of said main uprights to automatically engage said keepers when the basket is swung to erected position.

9. In a basket cart the combination of a forwardly tapered and forwardly inclined U-shaped base frame disposed with its bight end forwardly, uprights fixedly secured to the rear ends of the side members of said base frame, said uprights having a handle at their upper ends, carrying wheels for said base frame including caster wheels mounted at the front end thereof, a platform comprising a plurality of laterally spaced forwardly inclined bottom bars having upward offsets adjacent their front ends to provide stops, a fender disposed in front of the front ends of said platform bottom bars and having rearwardly projecting ends constituting guards for said caster wheels and secured to the side members of said base frame, forwardly projecting basket supporting arms on said uprights, a basket tapered towards its bottom pivotally mounted between said arms and balanced on its pivots to normally swing to a rearwardly facing position, and spring biased latches mounted on said uprights to automatically engage the basket when it is swung to erected position.

10. In a basket cart the combination of a base frame, uprights fixedly secured to the rear end of said base frame, said uprights having a handle at their upper ends, carrying wheels for said base frame, forwardly projecting basket supporting arms on said uprights, a basket tapered towards its bottom pivotally mounted between said arms and balanced on its pivots to normally swing to a rearwardly facing position, and spring biased latches mounted on said uprights to automatically engage the basket when it is swung to erected position.

11. In a basket cart the combination of a wheeled base frame, uprights at the rear end of said base frame, said uprights having a handle portion at their upper ends, carrying wheels for said frame, forwardly projecting basket supporting arms on said uprights, a basket tapered towards its bottom pivotally mounted between said arms and balanced on its pivots to normally swing to a rearwardly facing position, said basket being provided with laterally projecting keepers constituting stops engageable with said uprights when the basket is in horizontal position, and spring biased latches mounted on the uprights to automatically engage said keepers when the basket is swung to erected position.

12. In a basket cart the combination of a wheeled base frame, uprights at the rear end of said base frame, said uprights having a handle portion at their upper ends, carrying wheels for said frame, forwardly projecting basket supporting arms on said uprights, a basket tapered towards its bottom pivotally mounted between said arms and balanced on its pivots to normally swing to a rearwardly facing position, and spring biased latches mounted on the uprights to automatically engage said basket when the basket is swung to erected position.

WALKER R. ALEXANDER.

REFERENCES CITED

The following references are of record in the file of this patent:

UNITED STATES PATENTS

| Number | Name | Date |
|---|---|---|
| D. 155,971 | Concklin | Nov. 15, 1949 |
| 570,400 | Hill | Oct. 27, 1896 |
| 2,427,964 | Hansburg | Sept. 23, 1947 |
| 2,479,530 | Watson | Aug. 16, 1949 |
| 2,508,670 | Goldman | May 23, 1950 |
| 2,556,532 | Goldman | June 12, 1951 |